United States Patent [19]

Gongwer

[11] Patent Number: 4,599,938
[45] Date of Patent: Jul. 15, 1986

[54] GREASE AND LIQUID DRAINAGE MEMBER FOR A BARBEQUE COOKER

[76] Inventor: Dean Gongwer, 66740 Co. Rd. 103, Wakarusa, Ind. 46573

[21] Appl. No.: 771,286

[22] Filed: Aug. 30, 1985

[51] Int. Cl.⁴ ............................................. A47J 37/00
[52] U.S. Cl. .................................... 99/446; 126/25 R
[58] Field of Search ................. 99/444, 445, 446, 450, 99/425, 345; 126/25 R, 29, 30

[56] References Cited

U.S. PATENT DOCUMENTS

| | | | |
|---|---|---|---|
| 2,943,557 | 7/1960 | Suehlsen | 99/446 X |
| 3,173,357 | 3/1965 | Nunnery | 99/446 X |
| 3,499,380 | 3/1970 | Gongwer | 99/345 X |
| 4,170,173 | 10/1979 | Bradford | 99/446 X |
| 4,362,093 | 12/1982 | Griscom | 99/446 X |
| 4,453,457 | 6/1984 | Gongwer | 99/345 |

*Primary Examiner*—Billy J. Wilhite
*Attorney, Agent, or Firm*—James D. Hall

[57] ABSTRACT

A grease and liquid drainage member which includes a peripheral frame carrying a continuous peripheral trough. The frame is used to support a separate removable barbeque cooker having overlaping side parts which allow grease and other liquids formed during the cooking process to drain into the trough.

4 Claims, 6 Drawing Figures

GREASE AND LIQUID DRAINAGE MEMBER FOR A BARBEQUE COOKER

SUMMARY OF THE INVENTION

This invention relates to a support for a detachable barbeque cooker and has a specific application to the inclusion of a grease and liquid drainage component which forms a part of the support.

Automatic type food cooking machines or barbeque cookers have been utilized for many years. Such cookers are of the variety shown in U.S. Pat. Nos. 3,499,380 and 4,453,457, and are generally mounted upon wheels which enable the cooker to be moved from one location to another. While cookers of this nature are used for large outdoor barbeques, they also have applicability for indoor banquets and similar large gatherings. Such cookers are enclosed along the sides, ends and top and may also include flame or grease deflectors in their interiors. As such, grease drippings, food juices, and basting sauces drip from the cooker. Heretofore, unitary cookers have been designed with integral, attached peripheral troughs to catch such drippings. The difficulty with such a unitized construction involves the cleaning of the cooker and the trough. By having the trough and cooker of joined construction there is insufficient room to appropriately clean and rid the cooker and the trough of the grease and liquid collected during the cooking process.

In the following described invention, a frame member or support has been constructed which has a peripheral trough formed at its upper edge. A cooker, such as that shown in U.S. Pat. No. 4,453,457, is set upon the frame member with the cooker's side and end walls overlapping and extending over the trough. In this manner grease and other liquid formed during the cooking process flow directly into the trough. After cooking, the cooker may be lifted from the frame support and separately cleaned. The trough can be cleaned separately from the cooker in a simple and rapid manner.

Accordingly, it is an object of this invention to provide a frame member which is for supporting a separable barbeque cooker and which has a peripheral trough for catching grease and liquid drippings during the cooking process.

Another object of this invention is to provide a frame support member which is for a barbeque cooker and which includes easily cleaned grease and liquid drainage components for accomodating the cooking process in conjunction with the cooker.

Other objects of this invention will become apparent upon a reading of the following description.

BRIEF DESCRIPTION OF THE DRAWINGS

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention to enable others skilled in the art to utilize the invention.

Figure 1:
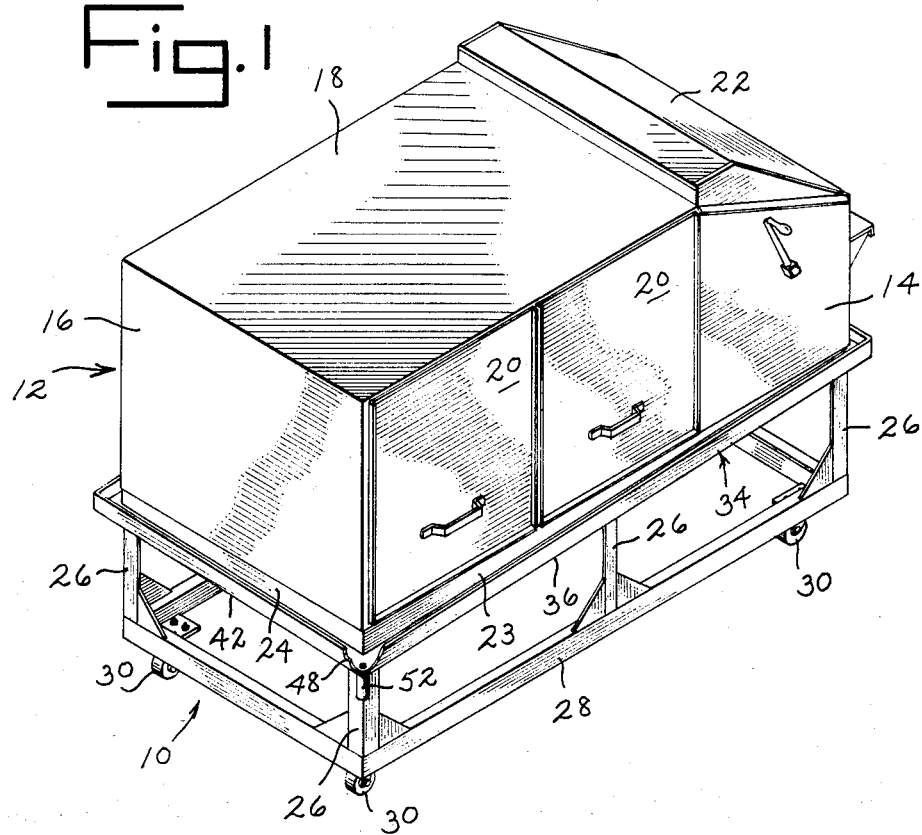
FIG. 1 is a perspective view of the frame support of this invention shown supporting a barbeque cooker.
Figure 2:
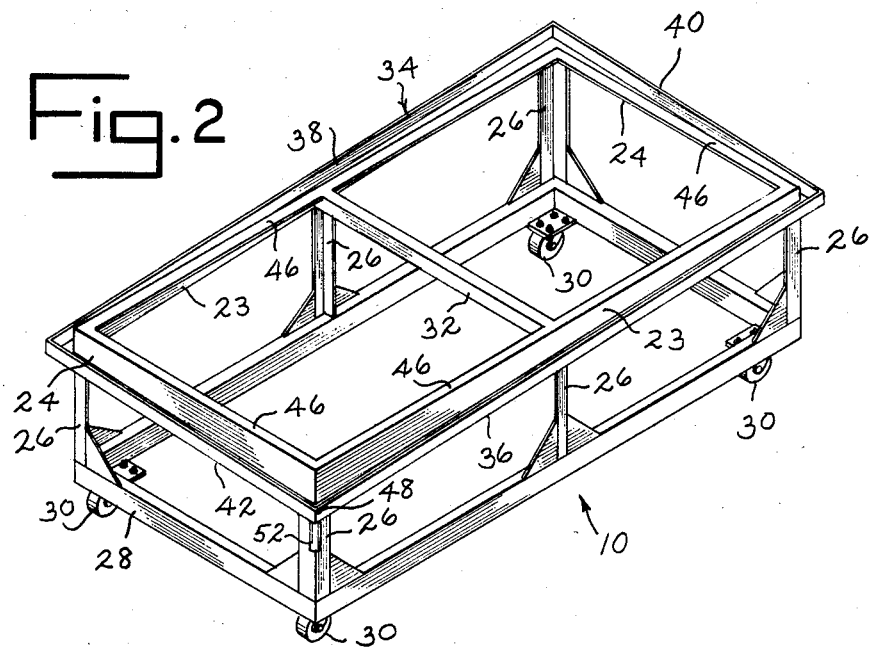
FIG. 2 is a perspective view of the frame support having the barbeque cooker removed.
Figure 3:
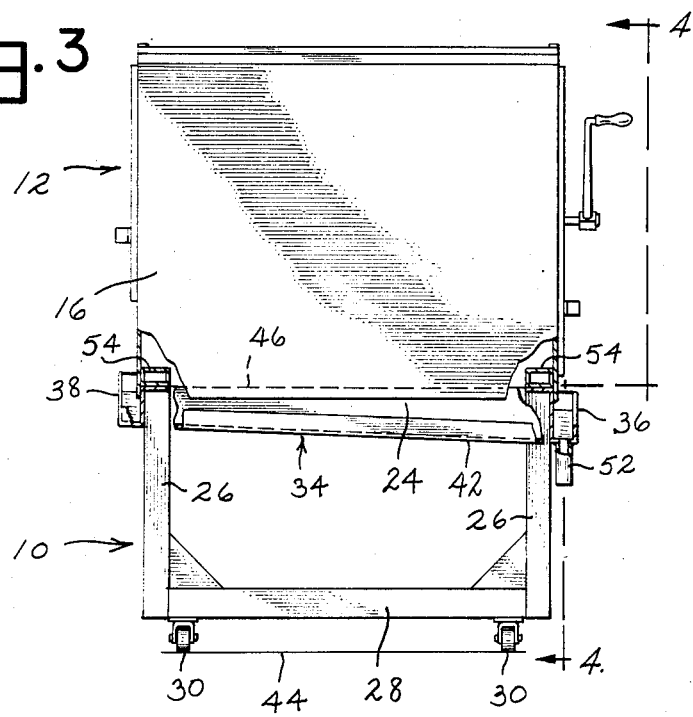
FIG. 3 is a rear end view of the barbeque cooker shown supported upon the frame support.
Figure 4:
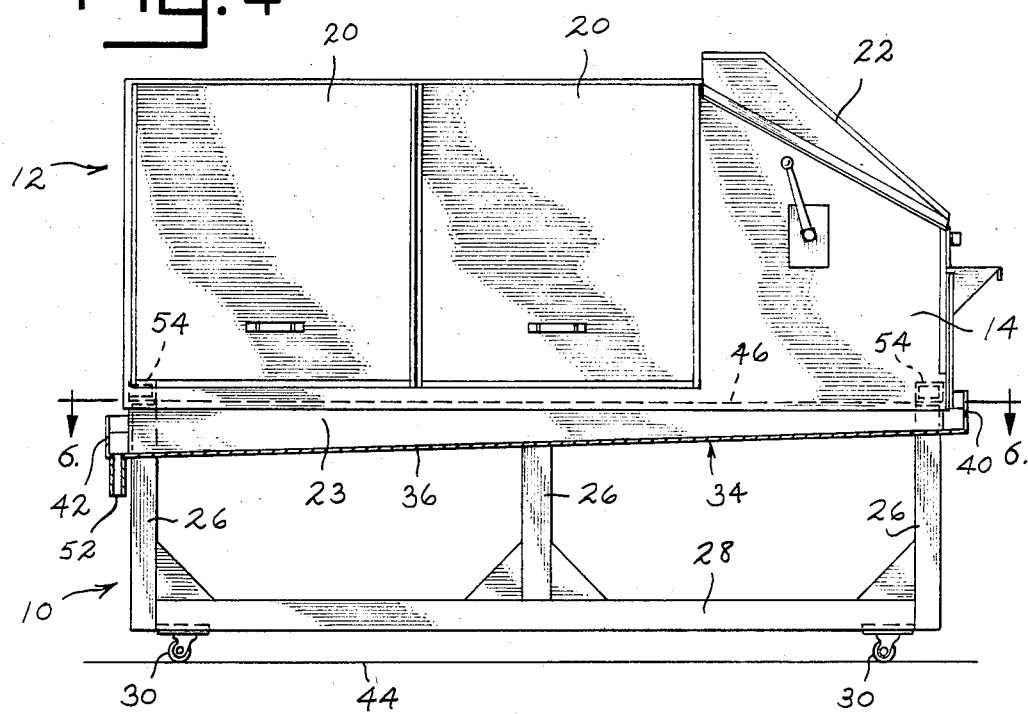
FIG. 4 is a side view of the barbeque cooker and frame support seen along line 4—4 of FIG. 3.
Figure 5:
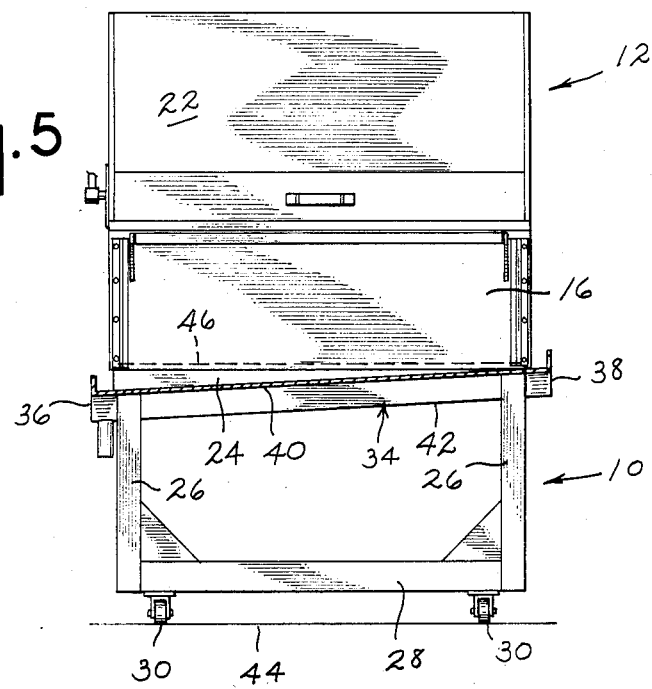
FIG. 5 is a front view of the barbeque cooker and frame support.

The grease and liquid drainage support 10 is shown in FIG. 1 supporting a cooker 12. Cooker 12 includes sides 14 and ends 16 interconnected by a top 18. The sides 14 include a plurality of raisable doors 20 which allow access into the interior of the cooker. Additionally, top 18 of cooker 12 includes a lift part 22 which enables the food items to be placed within the cooker. The interior of the cooker includes heating elements and food supporting items such as racks. The specifics of cooker 12 and its manner of operation can vary with U.S. Pat. Nos. 3,499,380 and 4,453,457 disclosing a few of such variations in cooker construction and operation. The specific construction of the cooker and its manner of operation does not form a novel part of this invention.

Support 10 is of a frame construction including connected upper longitudinal side members 23 and upper transverse end members 24. Legs 26 extend downwardly from side members 23 and end members 24 and are connected to a lower box frame 28. Wheels 30 are connected to box frame 28 for floor or ground engagement to enable support 10 when carrying cooker 12 to be manually moved from one location to another. A center transverse member 32 extends between side members 23.

Figure 6:
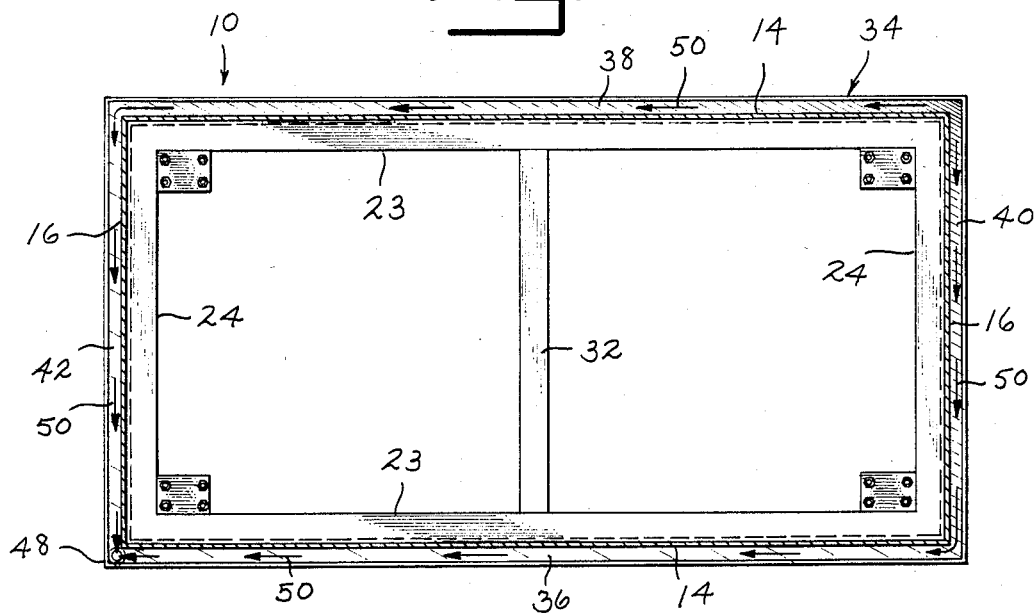
FIG. 6 is a fragmentary plan view of the frame support as seen along line 6—6 of FIG. 4.

Extending peripherally about and enclosing side members 23 and end members 24 of support 10 is a continuous trough 34 having side parts 36 and 38 and end parts 40 and 42. With support 10 being located upon a generally level floor 44 or the ground, the upper surfaces 46 of the support side and end members 23, 24 are generally horizontal. To facilitate the drainage of grease and other liquids which are produced during the cooking process with the use of cooker 12, trough end part 40 is inclined towards trough side part 36. Trough side part 38 is inclined towards trough end part 42. Trough end part 42 is inclined towards trough side part 36 and trough side part 36 is inclined toward trough end part 42. Thus the inclination of the various trough parts of trough 34 allow the grease and liquid material collected within the trough to drain towards the lowermost corner 48 of the trough as illustrated by arrows 50 in FIG. 6. Trough corner 48 includes a drain opening 52 which enables the trough to drain during use of the cooker and during washing or cleaning.

To use support 10 and its trough 34, cooker 12 is lifted and placed upon the support with lower frame part 54 of the cooker resting upon support side and end members 23, 24 over support legs 26. The sides 14 and ends 16 of cooker 12 overlap support side members 23 and end members 24 respectively and overlie trough 34. This enables grease and other liquid formed during the cooking process to drain down the inner faces of cooker sides 14 and ends 16 into trough 34. Additionally, the supported cooker may include one or more bottom components or plates which catch the drippings of the meat and divert the drippings to the sides of the cooker where they may also flow into trough 34. In this manner, the grease and liquid formed during the cooking process is collected within trough 34 of support 10 and appropriately drained away.

When it is desired to clean cooker 12 and support 10 after the cooking process, the cooker is lifted and removed from support 10 so as to enable the support and the cooker to be individually cleaned in a simple and rapid manner.

It is to be understood the invention is not to be limited to the details above given but may be modified within the scope of the appended claims.

What I claim is:

1. A grease and liquid drainage support for a barbeque cooker having sides and ends, said drainage support comprising a frame having longitudinal side members and transverse end members and adapted for floor or ground supporting contact, a continuous trough carried by said frame side and end members, said frame adapted to support said cooker when sat upon the frame with said cooker sides and ends extending over said trough, said trough constituting means for collecting grease and liquid from food as it is cooked within the cooker.

2. The drainage support of claim 1 wherein said trough includes interconnected spaced end parts and spaced side parts, said trough side parts being inclined toward one of said frame end members.

3. The drainage support of claim 2 wherein said trough end parts are inclined toward one of said frame side members.

4. The drainage support of claim 3 wherein said one frame end member and said one frame side member are connected at a corner of said frame, said trough having a grease and liquid drainage opening at said frame corner.

* * * * *